United States Patent
Haufe et al.

(10) Patent No.: US 10,213,722 B2
(45) Date of Patent: Feb. 26, 2019

(54) HEAT SEALED RECYCLABLE FILTER

(71) Applicant: Columbus Industries, Inc., Ashville, OH (US)

(72) Inventors: Michael K. Haufe, Upper Arlington, OH (US); James E. Large, Circleville, OH (US)

(73) Assignee: Columbus Industries, Inc., Ashville, OH (US)

( * ) Notice: Subject to any disclaimer, the term of this patent is extended or adjusted under 35 U.S.C. 154(b) by 0 days.

(21) Appl. No.: 14/959,451

(22) Filed: Dec. 4, 2015

(65) Prior Publication Data

US 2016/0158685 A1 Jun. 9, 2016

Related U.S. Application Data

(60) Provisional application No. 62/087,335, filed on Dec. 4, 2014.

(51) Int. Cl.
*B01D 53/22* (2006.01)
*B01D 46/02* (2006.01)
*B01D 46/06* (2006.01)
*B01D 46/00* (2006.01)

(52) U.S. Cl.
CPC ........... *B01D 46/023* (2013.01); *B01D 46/06* (2013.01); *B01D 46/00* (2013.01); *B01D 2201/04* (2013.01); *B01D 2265/04* (2013.01); *B01D 2267/00* (2013.01)

(58) Field of Classification Search
CPC ........ B01D 46/06; B01D 46/10; B01D 46/43; B01D 2201/04; B01D 46/00; B01D 46/023; B01D 2267/00; B01D 2265/04
See application file for complete search history.

(56) References Cited

U.S. PATENT DOCUMENTS

| | | | | |
|---|---|---|---|---|
| 2,269,461 | A * | 1/1942 | Lehmberg | A62B 23/02 128/206.15 |
| 3,042,571 | A * | 7/1962 | Jackson | B01D 29/111 156/191 |
| 4,277,874 | A * | 7/1981 | Brown | B01D 46/06 269/131 |
| 7,695,618 | B2 * | 4/2010 | Mules | B01D 27/08 210/232 |

(Continued)

*Primary Examiner* — Anthony R Shumate
(74) *Attorney, Agent, or Firm* — Jason H. Foster; Kremblas & Foster

(57) ABSTRACT

A rigid support is disposed in a filtration media element. A first gas-permeable filtration media layer is disposed in an overlapping orientation with a second gas-permeable filtration media layer. The first and second layers define a void in which the support is disposed. The first layer is attached to the second layer near opposing edges of the first and second layers and at an attachment termination point substantially centrally located on the filtration media element. The filtration media element has a first media end and an opposite, second media end. The support has a first support portion that extends from the first media end toward the attachment termination point. The support has second and third support portions that extend from the first support portion toward the second media end with a gap between the second and third support portions in which the attachment termination point is disposed.

7 Claims, 4 Drawing Sheets

(56) References Cited

U.S. PATENT DOCUMENTS

| | | | | |
|---|---|---|---|---|
| 8,681,030 B1* | 3/2014 | Huynh | ............... | H01L 24/06 |
| | | | | 257/531 |
| 2001/0029952 A1* | 10/2001 | Curran | ............... | A62B 18/10 |
| | | | | 128/206.17 |
| 2008/0066735 A1* | 3/2008 | Yeh | ............... | G01S 3/7861 |
| | | | | 126/578 |
| 2008/0314005 A1* | 12/2008 | Sauer | ............... | A47L 9/14 |
| | | | | 55/368 |
| 2009/0165432 A1* | 7/2009 | Yabu | ............... | F24F 1/0007 |
| | | | | 55/415 |
| 2013/0075347 A1* | 3/2013 | Bernard | ............... | B01D 29/07 |
| | | | | 210/767 |
| 2014/0102058 A1* | 4/2014 | Kaufmann | ............... | B01D 46/0004 |
| | | | | 55/482 |
| 2014/0298764 A1* | 10/2014 | Haufe | ............... | B01D 46/10 |
| | | | | 55/501 |
| 2016/0220344 A1* | 8/2016 | Dela | ............... | A61F 2/01 |
| 2017/0241193 A1* | 8/2017 | Fox | ............... | B01D 46/10 |
| 2018/0193788 A1* | 7/2018 | Nicolaou | ............... | B01D 46/0065 |

* cited by examiner

HEAT SEALED RECYCLABLE FILTER

CROSS-REFERENCES TO RELATED APPLICATIONS

This application claims the benefit of U.S. Provisional Application No. 62/087,335 filed Dec. 4, 2014. The prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to air filtration devices, and more particularly to air filters with filtration media surrounding an internal rigid support that can be removed from the used filtration media.

It is well known to construct an air filter 8 from filtration media 14 and a rigid support 10 mounted internally within the media. The rigid support 10 is commonly thick steel wire formed in a rectangularly-shaped support 10 as shown in FIG. 2, with the filtration media 14 surrounding the support 10 as shown in the cutaway of FIG. 1. The filtration media 14 is commonly a porous, polymer, non-woven batt material, formed in a sheet-like layer. Two sheets of this material are formed into a sleeve shape by stitching 12, welding or otherwise connecting the lateral edges of two layers of filtration media that are placed with their major surfaces against one another. The area located inside of the stitches 12 is devoid of stitching so that the media layers can be separated, such as for removing the support 10. The rigid support 10 is inserted into the opening in the sleeve-shaped media 14 and the open ends of the sleeve-shaped media 14 are then welded or stitched together to retain the rigid support 10 as shown in FIG. 1.

As shown in FIG. 3, the filter media 14 is also commonly welded or stitched at reinforcement points 16, inside of the perimeter of the filter 8 to prevent the portions of the layers of media 14 that are not stitched together from moving apart, or from moving cyclically toward and away from each other, when air is forced through. This configuration provides a filter with good rigidity and good filtration characteristics, but with poor ability to remove the support 10 for recycling or disposal. In order for the components of the filter 8 shown in FIGS. 1-3 to be separated, the stitching 12 and reinforcement points 16 must all be cut or removed so that the support 10 can be separated from the media 14. However, when this is attempted with a used filter, a substantial volume of filtered particles in the media is often returned to the environment due to mechanical agitation of the filter media, which is not acceptable.

BRIEF SUMMARY OF THE INVENTION

A gas filter disclosed herein may be formed by inserting a support into a sleeve made of a filtration media element. The filtration media element includes a first gas-permeable layer disposed in an overlapping orientation with a second gas-permeable layer. The first and second layers define a void between a major surface of the first layer and a facing major surface of the second layer. The first layer is attached to the second layer at least near opposing edges of the first and second layers and at an attachment termination point that is substantially centrally located on the filtration media element. The filtration media element has a first media end and an opposite, second media end. The support has a first support portion that extends from the first media end toward the attachment termination point. The support also has second and third support portions that extend from the first support portion toward the second media end with a gap between the second and third support portions in which the attachment termination point is disposed.

The filter is used in a conventional fashion by inserting it across a closed path air stream, such as in ductwork, typically upstream of a furnace or other HVAC air-moving unit. By positioning the attachment termination point substantially in the central region of the filtration media element, the first and second layers are supported where they are far from the peripheral edges. Thus, segments of the support extend immediately around the termination point so that the central region of the sleeve is supported near its weakest point.

Once the filter has reached the end of its useful life, it is removed from a filter-retaining structure and the support is pulled out of the used media element in the direction opposite that of insertion. This prevents the particulate contained in the media from being substantially disturbed, thereby preventing any substantial amount of the particulate from being returned to the environment. It will be appreciated that by fastening the media layers together near the central region of the media sleeve, the layers are supported to avoid separating during use. Further, the support may be removed from the filtration media element after use by simply sliding the support out of the open end of the filtration media element. Thus, little to no mechanical agitation is required to separate the support from the media for disposal.

Figure 1:
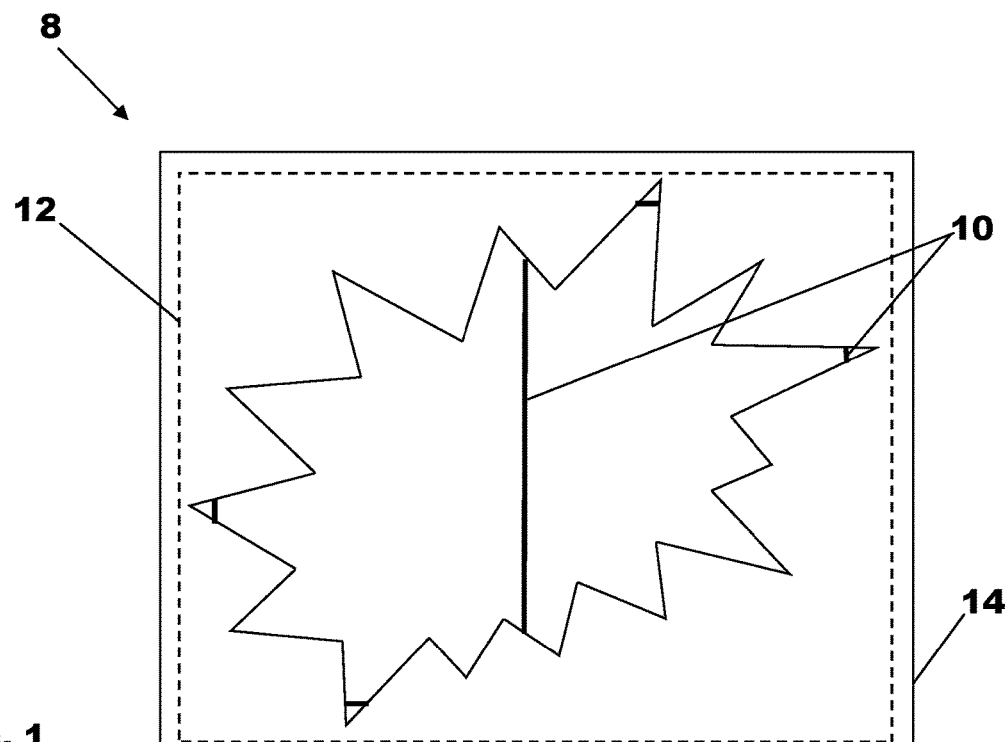
FIG. 1 is a side view in section illustrating a prior art filter.
Figure 2:
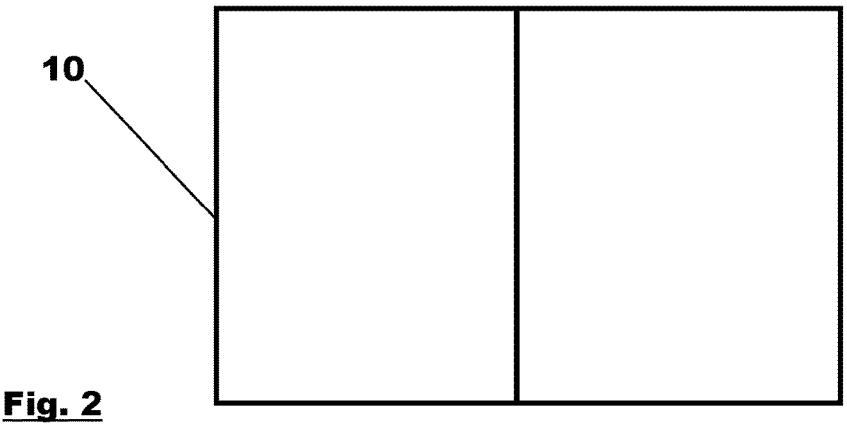
FIG. 2 is a side view illustrating a prior art filter support.
Figure 3:
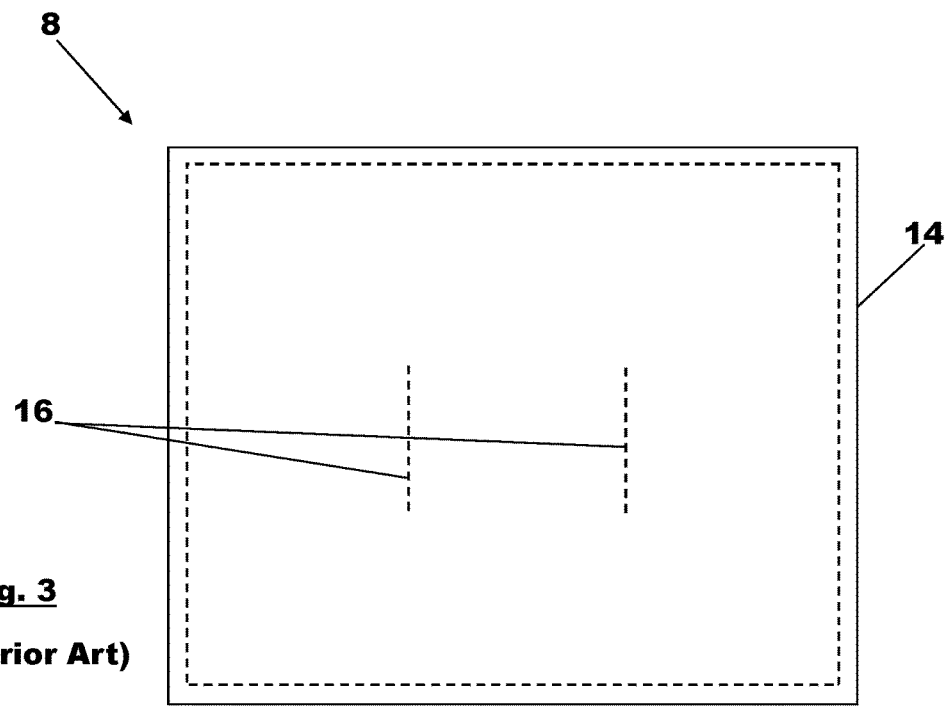
FIG. 3 is a side view illustrating the prior art filter of FIG. 1.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 62/087,335 filed Dec. 4, 2014 is incorporated in this application herein by reference.

Figure 4:
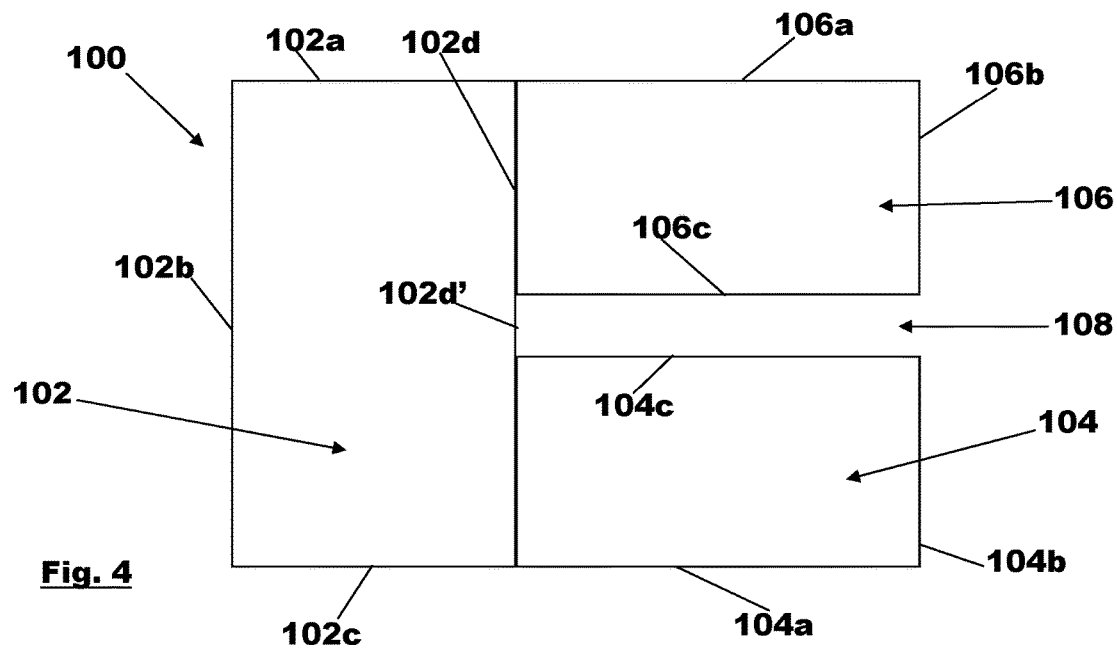
FIG. 4 is a side view illustrating a support used in a filter embodying the present invention.

A support 100 and sleeve 120 are disclosed herein and are described in more detail below with reference to FIGS. 4 to 7. The support 100 is shown in FIG. 4 having a first support portion 102, a second support portion 104 and a third support portion 106. The second and third portions 104 and 106 extend from the first portion 102 with a gap 108 formed therebetween. The combination of the first, second and third portions 102-106 may provide a generally U-shaped, substantially planar structure with a base that is formed by the first portion 102, and two legs that are formed by the second and third portions 104 and 106. The gap 108 is formed between the second and third portions.

In a preferred embodiment, the first portion 102 is formed of wire segments 102a, 102b, 102c and 102d. The wire of the support 100, and of all segments of all portions thereof, is preferably about 9 gauge steel, but may be in a range from about 8 gauge to about 11 gauge. All wire segments of the support 100 are disposed in substantially the same plane, which results in a substantially planar support 100. Such a support, while not precisely planar, may be placed on a planar surface, such as a table, with most or all components of the support 100 contacting the planar surface, or disposed away from the planar surface a few percent of the thickness of the wire segments. Of course, different materials would allow or demand larger or smaller diameters, as will become apparent to a person of ordinary skill.

The second portion 104 is formed of wire segments 104a, 104b, 104c and a portion of the wire segment 102d. The third portion 106 is formed of wire segments 106a, 106b, 106c and a different portion of wire segment 102d than forms part of the second portion 104. The gap 108 is formed between wire segments 104c and 106c and the segment 102d', which does not form any segment of the second or third portions 104 and 106. The gap 108 is in the range of a few percent to about fifty percent, and preferably about ten to twenty percent, of the width of the filter 108. For the filter 108, which is about 20 inches wide and about 30 inches long, the gap 108 may be two to six inches wide, but could be any size that permits the filter 130 to operate as described herein. The length of the gap is about one-half the length of the support 100, and may be about one-third to about two-thirds the length of the support 100. In all cases, the gap 108 extends to a location that is substantially central to the support 100. A substantially central location in the support 100 is within the central fifty percent of the area occupied by the support 100.

Figure 5:
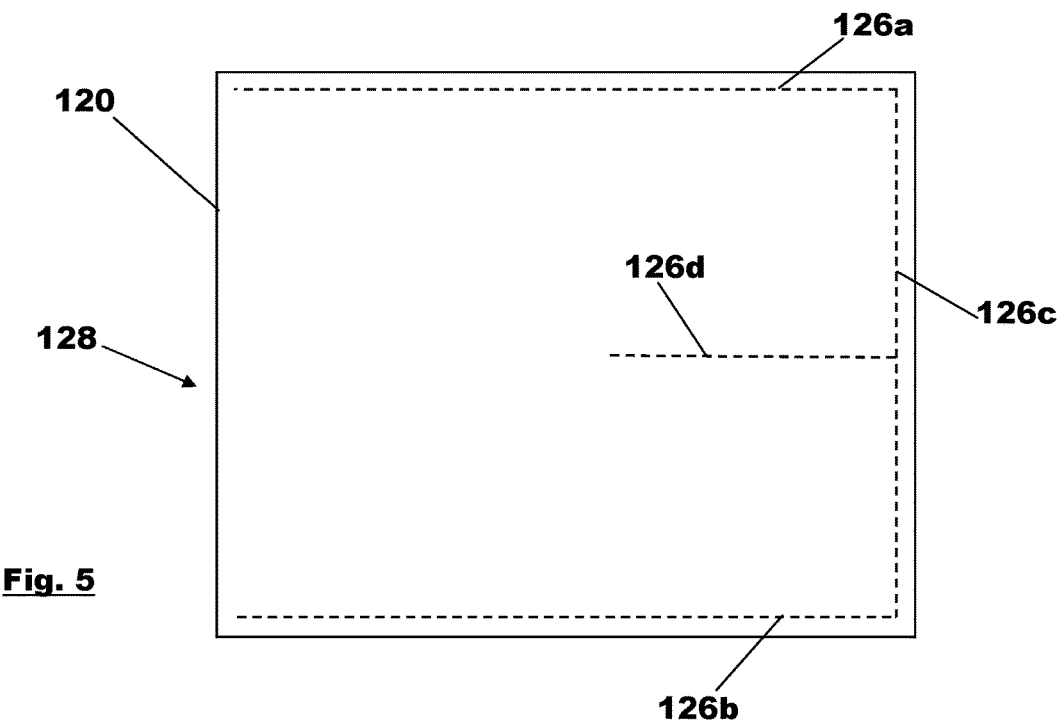
FIG. 5 is a side view illustrating a filter media sleeve embodying the present invention.
Figure 6:
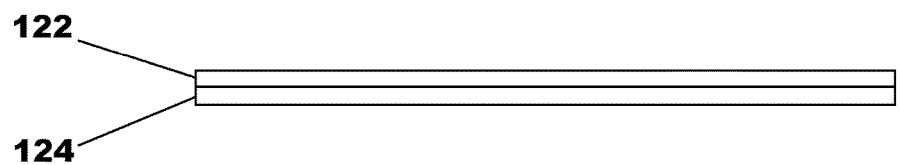
FIG. 6 is an end view illustrating the filter media sleeve of FIG. 5.

The sleeve 120, shown in FIGS. 5 and 6 prior to insertion of the support 100, is made of two or more media layers 122 and 124 in contact with one another on at least their adjacent major surfaces due to stitching 126, welding or other conventional means of attachment between the two media layers 122 and 124. The media is preferably non-woven, porous polyester, but could be any type of non-woven media. The preferred range of thickness is 0.5 to one inch for each layer, which would be 1-2 inches for the entire combination of the layers 122 and 124 when they are identical, but any thickness between about one-quarter inch to about three inches is acceptable. Also, the different layers 122 and 124 need not be made of the same material, nor must they be the same thickness. It is contemplated that the layers 122 and 124 may be made of different materials and different thicknesses.

Figure 7:
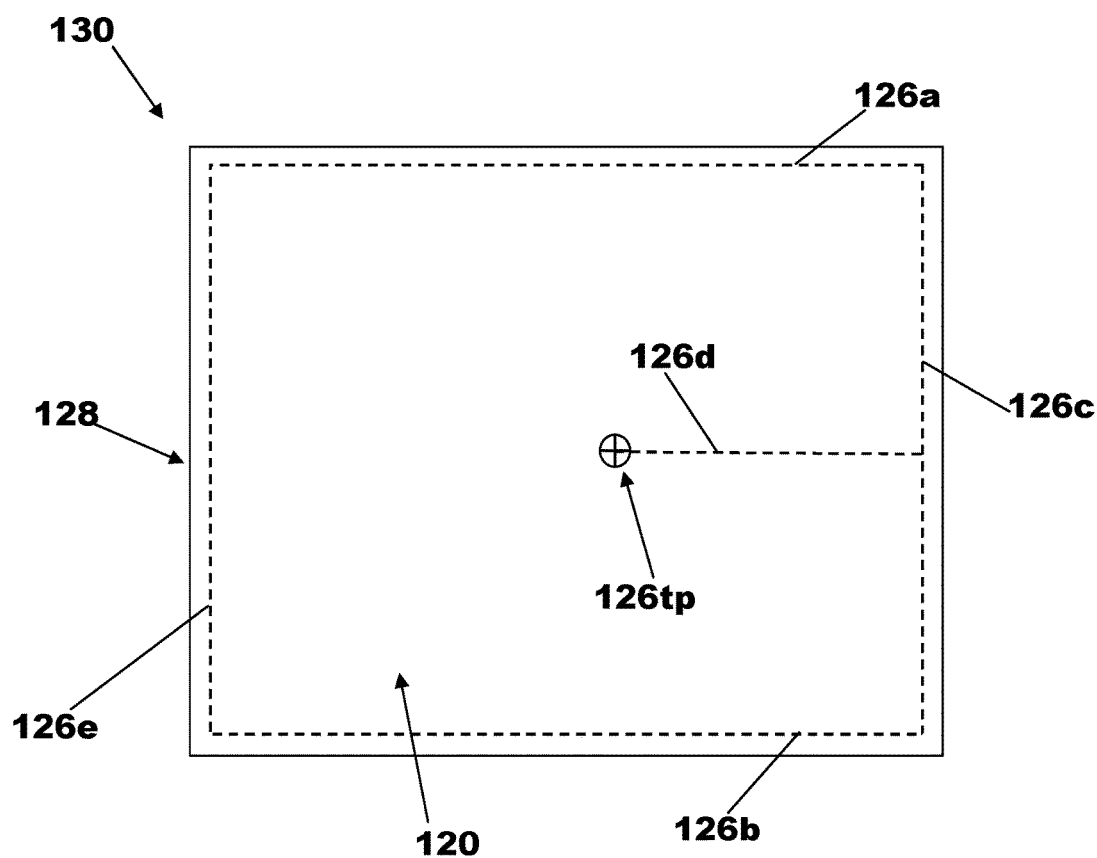
FIG. 7 is a side view illustrating a filter embodying the present invention.

The stitching lines 126a and 126b are shown in FIGS. 5 and 7 and are formed by sewing along both sides of the sleeve 120. The similar stitching line 126c is formed at one end of the sleeve 120. The similar stitching leg 126d extends from the line 126c into the central area of the sleeve 120 and traces a path corresponding to about the center of the gap 108 on the support 100. All of the stitching lines 126a-126d may be formed prior to inserting the support 100 into the sleeve 120. The stitching lines may be formed by thread that is sewn in a conventional fashion through both layers 122 and 124 to cause the facing major faces of the layer 122 and 124 to seat against one another. The stitching lines may alternatively be formed by adhering, welding or any other known form of attachment.

As shown in FIG. 5, the side 128 of the sleeve opposite the stitching line 126c is not stitched or otherwise fastened together, and this results in an end through which the support 100 can be inserted into a void in the sleeve 120 between the two media layers 122 and 124. In a preferred process, the second and third portions 104 and 106 of the support 100 are inserted into the open end 128 of the sleeve 120 before the first portion 102 is inserted, and this order of insertion allows the second and third portions 104 and 106 to extend first into the void formed between the media layers 122 and 124. With further insertion, the second and third portions 104 and 106 extend further into the void until the stitching leg 126d is disposed in the gap 108 between the second and third portions 104 and 106. During a contemplated step of the manufacture of the filter, after the support 100 is fully inserted with the first portion 102 completely within the sleeve 120, the side 128 may be stitched or otherwise conventionally closed along the stitching line 126e so that the sleeve 120 retains the support 100. However, the end 128 may be left open and without the stitching line 126e and friction prevents the support 100 from coming out of the sleeve 120 during use of the filter or subsequent typical handling.

The stitching line 126d may be formed as an extension of, and/or along, an attachment termination point 126tp that is located in the substantially central region of the sleeve 120. The attachment termination point 126tp may be a portion of the stitching line 126d at the center of the sleeve 120 as shown in FIG. 7. Alternatively, the attachment termination point 126tp may be at any location that is substantially central to the sleeve 120. A substantially central location in the sleeve 120 is within the central fifty percent of the area occupied by the sleeve 120. The advantage of the substantially central location of the termination point 126tp is that the layers 122 and 124 of the filtration media are best supported by gathering the layers and placing the segments that define the gap 108 around the layers 122 and 124 in the substantially central location. The location of the termination point 126tp may be at about one-half the length of the sleeve 120, and may be at between about one-third to two-thirds the length of the sleeve 120.

The filter 130 that is formed from the support 100 in the sleeve 120 is used in a conventional fashion by inserting it across a closed path air stream, such as in ductwork, typically upstream of a furnace or other HVAC air-moving unit. By positioning the attachment termination point 126tp substantially in the central region of the sleeve 120, the sleeve's 120 layers 122 and 124 are supported where they are far and/or farthest from the peripheral edges where the support 100 provides rigidity to the sleeve 120. By the segments of the support 100 extending immediately around the termination point 126*tp*, the central region of the sleeve 120 is supported well near where it would otherwise be least supported in the prior art filters so that gas flowing through does not overly distort or disrupt either layer 122 or 124.

Once the filter has reached the end of its useful life, it is removed from a filter-retaining structure and the support 100 is pulled out of the used filter sleeve 120 in the direction opposite that of insertion, so that the stitching leg 126*d* slips out of the gap 108 along the length of the gap 108. This quick removal prevents the media, and particulate contained therein, from being substantially disturbed, thereby preventing any substantial amount of the particulate from being returned to the air. Then the support 100 can be used again or recycled. Furthermore, the filtration media sleeve 120 can be discarded apart from the support 100, or it can be recycled.

It will be appreciated from the description herein that the stitching leg 126*d* fastens the media layers 122 and 124 together, even as far as the central region of the media sleeve 120, and thereby keeps the layers 122 and 124 from separating during use sufficiently to cause the negative results of the prior art. However, because of the configuration of the sleeve 120 and the support 100, the support 100 can be removed from the sleeve 120 after use by simply sliding the support 100 out of the open end 128 of the sleeve. Thus, little to no mechanical agitation is required to separate the support 100 from the media sleeve 120 for recycling, disposal or re-use.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A gas filter comprising:
   (a) a filtration media element including at least a first gas-permeable layer disposed in an overlapping orientation with a second gas-permeable layer, the first and second layers defining a void between a major surface of the first layer and a facing major surface of the second layer, the first layer attached to the second layer at least at a first line of attachment formed near a first edge of the first and second layers, at a second line of attachment formed near a second, opposing edge of the first and second layers and at an attachment termination point that is substantially centrally located on the filtration media element, the filtration media element having a first media end and an opposite, second media end; and
   (b) a rigid support disposed in the void, the support having a first support portion that extends from the first media end toward the attachment termination point, the support also having second and third support portions that extend from the first support portion toward the second media end with a gap between the second and third support portions in which the attachment termination point is disposed.

2. The gas filter in accordance with claim 1, wherein the attachment termination point is disposed along a line that extends from adjacent the second media end toward the first media end, and along which the first layer and second layer are attached.

3. The gas filter in accordance with claim 2, wherein the line extends from substantially a central region of the filter media element to the second media end.

4. The gas filter in accordance with claim 3, wherein the support is U-shaped.

5. A gas filtration media element comprising:
   (a) a first gas-permeable filtration layer; and
   (b) a second gas-permeable filtration layer disposed in an overlapping orientation with the first layer, the first and second layers defining a void between a major surface of the first layer and a facing major surface of the second layer that is configured to receive a rigid support;
   wherein the first layer is attached to the second layer at least at a first line of attachment formed near a first edge of the first and second layers, at a second line of attachment formed near a second, opposing edge of the first and second layers and at an attachment termination point that is substantially centrally located on the filtration media element.

6. The filtration media element in accordance with claim 5, wherein the filtration media element has a first media end and an opposite, second media end, and wherein the attachment termination point is disposed along a line that extends from adjacent the second media end toward the first media end, and along which the first layer and second layer are attached.

7. The filtration media element in accordance with claim 6, wherein the line extends from substantially a central region of the filter media element to the second media end.

* * * * *